US012722610B2

(12) United States Patent
Bae et al.

(10) Patent No.: US 12,722,610 B2
(45) Date of Patent: Sep. 1, 2026

(54) BRAKE APPARATUS

(71) Applicants: Hyundai Motor Company, Seoul (KR); Kia Corporation, Seoul (KR)

(72) Inventors: Seung Hyeob Bae, Ansan-si (KR); Kyoung Woo Kang, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 548 days.

(21) Appl. No.: 18/224,707

(22) Filed: Jul. 21, 2023

(65) Prior Publication Data

US 2024/0326763 A1 Oct. 3, 2024

(30) Foreign Application Priority Data

Mar. 29, 2023 (KR) ........................ 10-2023-0041253

(51) Int. Cl.
*B60T 8/40* (2006.01)
*B60T 13/14* (2006.01)

(52) U.S. Cl.
CPC ............ *B60T 8/409* (2013.01); *B60T 13/142* (2013.01)

(58) Field of Classification Search
CPC .......... B60T 8/409; B60T 13/142; B60T 7/04; B60T 7/042; B60T 8/4086; B60T 13/686; G05G 5/03
See application file for complete search history.

(56) References Cited

U.S. PATENT DOCUMENTS 8,010,269 B2 * 8/2011 Toyohira ............... B60T 13/745 701/82
2011/0132703 A1 6/2011 Kim et al.
2012/0193975 A1 * 8/2012 Ishii ...................... B60T 8/4081 303/14
2019/0092307 A1 3/2019 Kim

FOREIGN PATENT DOCUMENTS

KR 10-2011-0061081 A 6/2011
KR 10-2011-0138532 A 12/2011
KR 10-2019-0034903 A 4/2019

OTHER PUBLICATIONS

German Patent No. DE 102012203099 to Bayer et al published on Nov. 8, 2012.*
Korean Patent No. KR 20120128862 published on Nov. 28, 2012.*
Translation of Korean Patent No. KR 20110138532 obtained from website: https://worldwide.espacenet.com on Dec. 15, 2025.*

* cited by examiner

*Primary Examiner* — Pamela Rodriguez
(74) *Attorney, Agent, or Firm* — Morgan, Lewis & Bockius LLP

(57) ABSTRACT

A brake apparatus includes a reservoir in which oil is accommodated; a master cylinder fluidically connected to the reservoir; a pedal simulator fluidically connected to the master cylinder and into which the oil flows; and a brake pedal connected to the master cylinder and configured to be moved in response to a driver's operation, wherein the master cylinder includes a first piston movably provided in a first bore of the master cylinder and a second piston provided in a second bore of the master cylinder and movable by the first piston, the pedal simulator and the master cylinder are fluidically connected to each other by a connection line through which the oil flows, and the connection line is provided with a first valve controlling the flow of the oil to control movement of the second piston.

18 Claims, 5 Drawing Sheets

BRAKE APPARATUS

CROSS-REFERENCE TO RELATED APPLICATION(S)

The present application claims priority to Korean Patent Application No. 10-2023-0041253 filed on Mar. 29, 2023, the entire contents of which is incorporated herein for all purposes by this reference.

BACKGROUND OF THE PRESENT DISCLOSURE

Field of the Present Disclosure

The present disclosure relates to a brake apparatus.

Description of Related Art

In general, a brake apparatus for a vehicle may be a device that reduces a speed of the vehicle in motion or stops the vehicle, or generates braking force of the vehicle to maintain the stopped state of the vehicle, may convert, during deceleration, kinetic energy of the vehicle into a thermal energy due to mechanical friction, and may achieve braking by emitting heat of the friction into the atmosphere.

The brake apparatus for the vehicle may include a drum-type hydraulic brake, a disc-type hydraulic brake, and the like. Thereamong, the disc-type hydraulic brake may be configured to press a disc rotating together with a wheel against friction pads (brake pads), instead of a drum, on both sides, to obtain braking force.

However, the hydraulic brakes may require a mechanical component connected to a brake pedal of a driver's seat, a hydraulic pipe, a component for controlling a hydraulic pressure, or the like, to complicate configurations thereof. Therefore, an electric-type brake may be developed and used to simplify a configuration of a brake apparatus.

Meanwhile, demand for eco-friendly vehicles (EV, HEV, and FCEV) has recently been increasing, and there may be a problem in that tuning factors of a pedal effort and stroke of a braking controller (an integrated electric booster), which has been applied to such eco-friendly vehicles, are limited. In other words, there may be a problem in that tuning ranges of the pedal effort and the stroke are limited due to layouts of the vehicles.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a brake apparatus configured for reducing a sense of difference felt by a driver according to a vehicle driving mode, to improve pedal feel.

A brake apparatus according to an exemplary embodiment of the present disclosure includes a reservoir in which oil is accommodated: a master cylinder fluidically connected to the reservoir: a pedal simulator fluidically connected to the master cylinder and into which the oil flows; and a brake pedal connected to the master cylinder and configured to be moved in response to a driver's operation, wherein the master cylinder includes a first piston movably provided in a first bore of the master cylinder and a second piston provided in a second bore of the master cylinder and movable by the first piston, the pedal simulator and the master cylinder are fluidically connected to each other by a connection line through which the oil flows, and the connection line is provided with a first valve controlling the flow of the oil to control movement of the second piston.

The reservoir and the first bore may be connected to each other by a first pipe, the reservoir and the second bore may be connected to each other by a second pipe, and a second valve controlling the flow of the oil may be provided in the second pipe.

The first valve and the second valve may be selectively opened.

The connection line may connect a fourth pipe connected to the second bore, and the pedal simulator.

The master cylinder may include a cylinder housing including an internal space: a cylinder rod connecting the first piston and the brake pedal: a first spring including a first end portion supported by the first piston and a second end portion supported by the second piston: a second spring including a first end portion supported by the second piston and a second end portion supported by a first stopper provided in the cylinder housing; and a first damper disposed between the second piston and the first stopper.

The master cylinder may further include a second damper disposed inside the second spring and supported by the first stopper.

The master cylinder may further include a first cover disposed on one side of the first stopper and closing one side of the cylinder housing.

The pedal simulator may include a case including an internal space: a third piston movably provided in the case: a second stopper fixed to the case: a third spring including a first end portion supported by the third piston and a second end portion supported by the second stopper; and a third damper disposed between the third piston and the second stopper.

An inlet into which the oil flows may be provided in one end portion of the case.

A pedal effort applied to the brake pedal to move the third piston may be greater than a pedal effort applied to the brake pedal to move the second piston.

A brake apparatus according to an exemplary embodiment of the present disclosure includes a reservoir in which oil is accommodated: a master cylinder fluidically connected to the reservoir: a pedal simulator fluidically connected to the master cylinder; and a brake pedal connected to the master cylinder, wherein the master cylinder is provided with a first bore fluidically connected to the reservoir through a first pipe and a second bore fluidically connected to the reservoir through a second pipe, a first piston is movably provided in the first bore and a second piston is movably provided in the second bore, the pedal simulator and the master cylinder are fluidically connected to each other by a connection line through which the oil flows, a first valve controlling the flow of the oil is provided in the connection line, a second valve controlling supply of the oil from the reservoir to the second bore is provided in the second pipe, and the first valve and the second valve are selectively opened.

The pedal simulator may be provided with a third piston configured to be moved in upward and downward directions by supply of the oil, wherein a pedal effort applied to the brake pedal for movement of the second piston may be smaller than a pedal effort applied to the brake pedal for movement of the third piston.

The master cylinder may include a first spring providing restorative force to the first piston and a second spring providing restorative force to the second piston.

The master cylinder may be provided with a first damper preventing damage to the second piston.

The pedal simulator may include a third spring providing restorative force to the third piston.

The pedal simulator may include a third damper preventing damage to the third piston.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
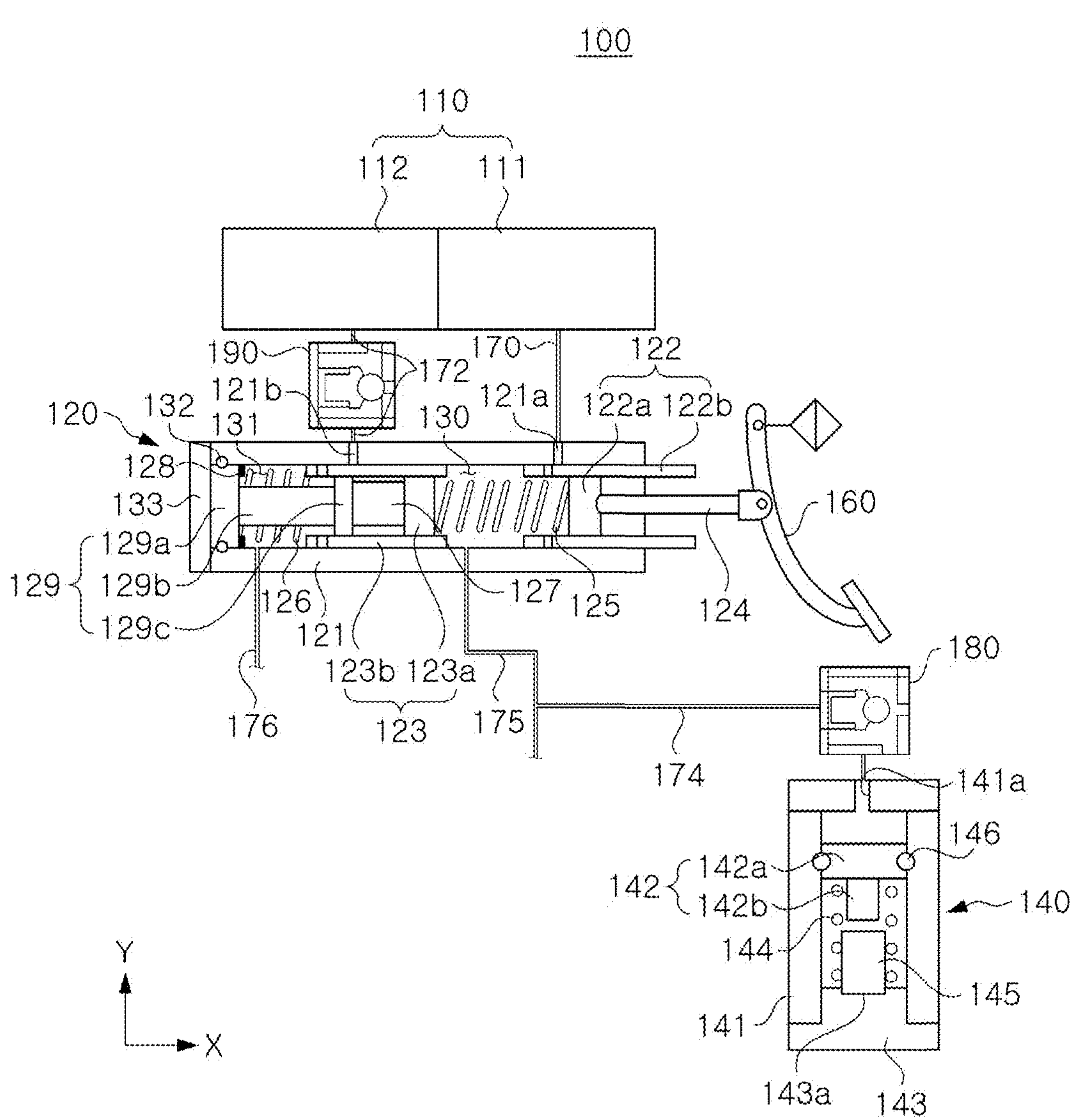
FIG. 1 is a schematic diagram illustrating a brake apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Prior to the detailed description of the present disclosure, the terms or words used in the specification and claims of the present disclosure, to be described below, should not be construed as being limited to a common or dictionary meaning, and the inventors should use their own invention in the best manner. It should be interpreted as a meaning and concept corresponding to the technical idea of the present disclosure based on the principle properly defined as a concept of a term for explanation. Therefore, because embodiments described in the present specification and configurations illustrated in the drawings are only the most exemplary embodiments of the present disclosure, and do not represent all of the technical ideas of the present disclosure, it should be understood that various equivalents and variations are replaced at the time of filing the present application.

Hereinafter, exemplary embodiments of the present disclosure will be described with reference to the accompanying drawings. However, the exemplary embodiments of the present disclosure may be modified in various forms, and the scope of the present disclosure may not be limited to the exemplary embodiments described below. Furthermore, the exemplary embodiments of the present disclosure may be provided to more completely explain in an exemplary embodiment of the present disclosure to those skilled in the art. The shapes and sizes of elements in the drawings may be exaggerated for clarity.

Also, in the present specification, singular expressions include plural expressions unless the context clearly indicates otherwise, and the same reference numerals throughout the specification denote the same or corresponding components.

Furthermore, in the present specification, expressions such as “on,” “an upper portion,” “below,” “a lower portion,” “a side surface,” “a front surface,” “a rear surface,” and the like may be expressed based on the directions illustrated in the drawings, and may be expressed differently when a direction of an object of interest is changed.

FIG. 1 is a schematic diagram illustrating a brake apparatus according to an exemplary embodiment of the present disclosure.

Referring to FIG. 1, a brake apparatus 100 according to an exemplary embodiment of the present disclosure may include a reservoir 110, a master cylinder 120, a pedal simulator 140, and a brake pedal 160.

The reservoir 110 may include an internal space in which oil is accommodated. For example, the reservoir 110 may include a first accommodating portion 111 connected to a first bore 130 of the master cylinder 120 to be described later, and a second accommodating portion 112 connected to a second bore 131 of the master cylinder 120 to be described later.

The master cylinder 120 may be connected to the reservoir 110. For example, the master cylinder 120 may include a cylinder housing 121, a first piston 122, a second piston 123, a cylinder rod 124, a first spring 125, a second spring 126, a first damper 127, a second damper 128, and a first stopper 129.

The cylinder housing 121 may include an internal space, and may include a shape in which both end portions are exposed. The internal space of the cylinder housing 121 may include the first bore 130, which may be a space in which the first piston 122 moves, and the second bore 131, which may be a space in which the second piston 123 moves. Also, the first stopper 129 may be provided on one end portion of the cylinder housing 121, to close the one end portion of the cylinder housing 121. Furthermore, oil may be filled in the first bore 130 and the second bore 131. Furthermore, first and second pipes 170 and 172, to be described below; through which oil flows may be connected to the cylinder housing 121, to supply the oil from the reservoir 110 or return the oil to the reservoir 110. The first pipe 170 may be connected to a first communication hole 121*a* of the cylinder housing 121, and the second pipe 172 may be connected to a second communication hole 121*b* of the cylinder housing 121.

The first piston 122 may be connected to the brake pedal 160 through the cylinder rod 124. For example, the first piston 122 may be movably provided in the first bore 130 of the cylinder housing 121. Therefore, when a driver presses the brake pedal 160 to apply a force to the brake pedal 160, as the force is transmitted through the cylinder rod 124 while the first piston 122 moves toward the second piston 123, a volume of the first bore 130 may decrease. Thereafter, when the driver takes his or her foot off the brake pedal 160, as the force applied to the brake pedal 160 (i.e., a pedal effort) is removed while the first piston 122 moves away from the second piston 123, the volume of the first bore 130 may increase. For example, the first piston 122 may include a first body 122*a* and a first sidewall portion 122*b* disposed to extend from a side surface of the first body 122*a* toward both sides of the cylinder housing 121 in a longitudinal direction of the cylinder housing 121.

The pedal effort refers to a force required to press a pedal.

Also, the first communication hole 121*a* of the cylinder housing 121 may be opened or closed according to movement of the first piston 122.

The second piston 123 may be disposed in the second bore 131 of the cylinder housing 121, and may move by the first piston 122. Therefore, as oil flows in and out of the second bore 131, a volume of the second bore 131 may increase or decrease. When the first piston 122 is in contact with the second piston 123 and the driver continuously presses the brake pedal 160, the second piston 123 may move in conjunction with the first piston 122. For example, the second piston 123 may include a second body 123*a* and a second sidewall portion 123*b* disposed to extend from a side surface of the second body 123*a* toward both sides of the cylinder housing 121 in the longitudinal direction of the cylinder housing 121.

In the instant case, the longitudinal direction of the cylinder housing 121 means an X-axis direction in FIG. 1.

Also, the second communication hole 121*b* of the cylinder housing 121 may be opened or closed according to movement of the second piston 123.

The piston rod 124 may have one end portion connected to the first piston 122 and the other end portion connected to the brake pedal 160. The piston rod 124 may include a bar shape as an exemplary embodiment of the present disclosure, and the other end portion of the piston rod 124 may be coupled to the brake pedal 160 by a hinge. For example, the piston rod 124 may be connected to one surface of the first body 122*a* provided on the first piston 122.

The first spring 125 may have one end portion supported by the first piston 122 and the other end portion supported by the second piston 123. For example, the first spring 125 may be a coil spring. Furthermore, when the driver presses the brake pedal 160 to apply a force to the brake pedal 160, as the force is transmitted through the cylinder rod 124 while the first piston 122 moves toward the second piston 123, the first spring 125 may be compressed. Furthermore, when the driver takes his or her foot off the brake pedal 160, the force applied to the brake pedal 160 (i.e., a pedal effort) may be removed. Therefore, the first piston 122 may move away from the second piston 123 by restorative force of the first spring 125.

The second spring 126 may have one end portion supported by the second piston 123 and the other end portion supported by the first stopper 129. For example, the second spring 126 may be a coil spring. When the driver presses the brake pedal 160 to apply a force to the brake pedal 160, the first piston 122 may move. Thereafter, when compression of the first spring 125 is completed, the first piston 122 may be in contact with the second piston 123, and when the driver continuously presses the brake pedal 160, the second piston 123 may move in conjunction with the first piston 122, and thus, the second spring 126 may be compressed. Thereafter, when the driver takes his or her foot off the brake pedal 160, the force applied to the brake pedal 160 may be removed. Therefore, as the second spring 126 extends, the second piston 123 may be restored to an original position thereof.

The first damper 127 may be disposed between the second piston 123 and the first stopper 129. For example, the first damper 127 may be formed of a material including elasticity, and when the second piston 123 moves, the first damper 127 may contact with the first stopper 129 to prevent breakage of the second piston 123 and the first stopper 129. For example, the first damper 127 may include a shape of cylinder.

The second damper 128 may be disposed inside the second spring 126, and may be supported by the first stopper 129. The second damper 128 is configured to prevent damage caused by contact between an end portion of the second piston 123 and the first stopper 129. To the present end, the second damper 128 may be formed of a material including elasticity.

The first stopper 129 may be disposed in one end portion of the internal space of the cylinder housing 121. For example, the first stopper 129 may include a base portion 129*a* in which a first sealing member 132 is disposed between the first stopper 129 and the cylinder housing 121, an extension portion 129*b* extending to one surface of the base portion 129*a*, and a guide portion 129*c* for guiding movement of the second piston 123. Also, the guide portion 129*c* may be in contact with an internal surface of the second sidewall portion 123*b* from an internal side of the second sidewall portion 123*b* of the second piston 123, to guide the movement of the second piston 123.

A first cover 133 for closing one end portion of the cylinder housing 121 may be provided on one side of the first stopper 129.

The pedal simulator 140 may be connected to the master cylinder 120, and oil may flow thereinto. For example, the pedal simulator 140 may include a case 141, a third piston 142, a second stopper 143, a third spring 144, and a third damper 145.

The case 141 may include an internal space, and an inlet 141*a* into which the oil flows may be provided in one end portion of the case 141. Accordingly, as the oil flows in and out of the inlet 141*a*, the third piston 142 may move.

The third piston 142 may be movably provided in the internal space of the case 141. For example, the third piston 142 may move by a pressing force into which the oil flows through the inlet 141*a*, and restorative force by the third spring 144. The third piston 142 may include a third body 142*a* in which a second sealing member 146 is disposed between the case 141, and a pillar portion 142*b* extending from one surface of the third body 142*a*.

The second stopper 143 may be fixed to the other end portion of the case 141, and is configured to close the other end portion of the case 141. To the present end, the second stopper 143 may be formed to include a step difference. For example, the second stopper 143 may be disposed to oppose the pillar portion 142*b* of the third piston 142.

The third spring 144 may have one end portion supported by the third piston 142 and the other end portion supported by the second stopper 143. For example, the third spring 144 may be a coil spring, and when a hydraulic pressure applied to the third piston 142 is removed, the third piston 142 may be restored to an original position thereof by restorative force. Furthermore, the one end portion of the third spring 144 may be forcedly inserted into the pillar portion 142*b* of the third piston 142.

The third damper 145 may be disposed between the third piston 142 and the second stopper 143. For example, the third damper 145 may be formed of a material including elasticity. Also, one end portion of the third damper 145 may be inserted into a groove 143*a* formed on one surface of the second stopper 143, and when the third piston 142 moves, the third damper 145 is configured to prevent breakage of the third piston 142 and the stopper 143 caused by contact with the stopper 143.

The brake pedal 160 may be connected to the master cylinder 120, and may be configured to be operated by the driver. For example, the brake pedal 160 may be connected to the cylinder rod 124 of the master cylinder 120, to move the first piston 122 provided in the master cylinder 120.

As described above, the reservoir 110 may include the first accommodating portion 111 connected to the first bore 130 of the master cylinder 120, and the second accommodating portion 112 connected to the second bore 131 of the master cylinder 120, and the first accommodating portion 111 and the first bore 130 may be connected to each other by the first pipe 170, and the second accommodating portion 112 and the second bore 131 may be connected to each other by the second pipe 172. Furthermore, the master cylinder 120 may be connected to the pedal simulator 140. The first bore 130 of the master cylinder 120 and the case 141 of the pedal simulator 140 may be connected to each other by a third pipe 175 and a connection line 174, to be described later. A first valve 180 for controlling flow of oil from the first bore 130 to the pedal simulator 140 may be provided in the connection line 174, and a second valve 190 for controlling flow of oil from the second accommodating portion 112 to the second bore 131 may be provided in the second pipe 172.

The first valve 180 may be an NO valve (a normal open valve) as an exemplary embodiment of the present disclosure, and the second valve 190 may be an NC valve (a normal close valve) as an example. Therefore, when current is applied to the first valve 180, the first valve 180 may be closed, and when the current is not applied to the first valve 180, the first valve 180 may be opened. Furthermore, when current is applied to the second valve 190, the second valve 190 may be opened, and when the current is not applied to the second valve 190, the second valve 190 may be closed. In the instant case, a case in which the first valve 180 is an NO valve (a normal open valve) and the second valve 190 is an NC valve (a normal close valve) is illustrated as an exemplary embodiment of the present disclosure, but is not limited thereto.

Accordingly, because the first valve 180 provided in the connection line 174 and the second valve 190 provided in the second pipe 172 may be selectively opened to improve the driver's pedal feel.

Figure 2:
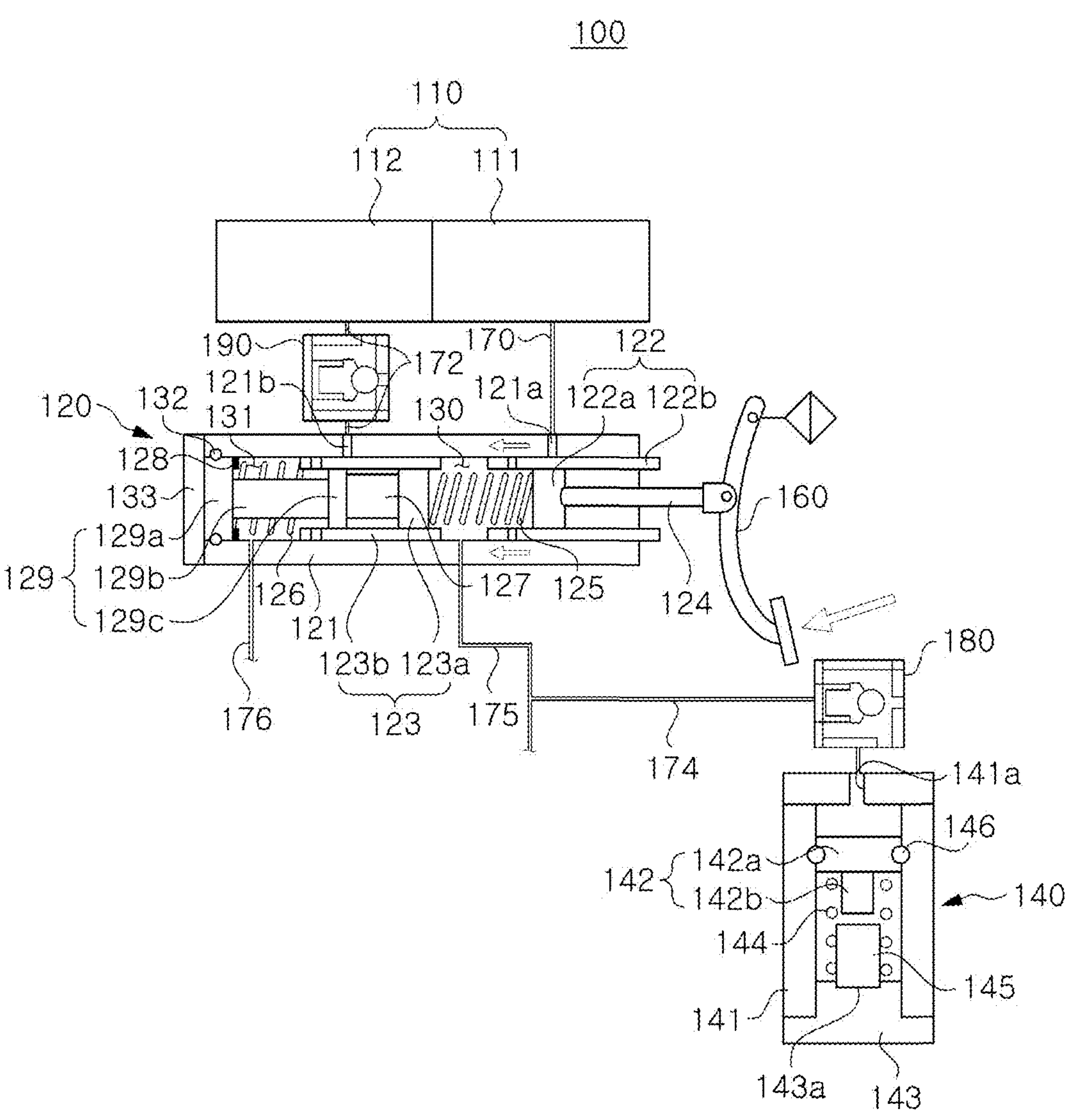
FIG. 2, FIG. 3 and FIG. 4 are explanatory diagrams illustrating an operation of a brake apparatus according to an exemplary embodiment of the present disclosure.
Figure 3:
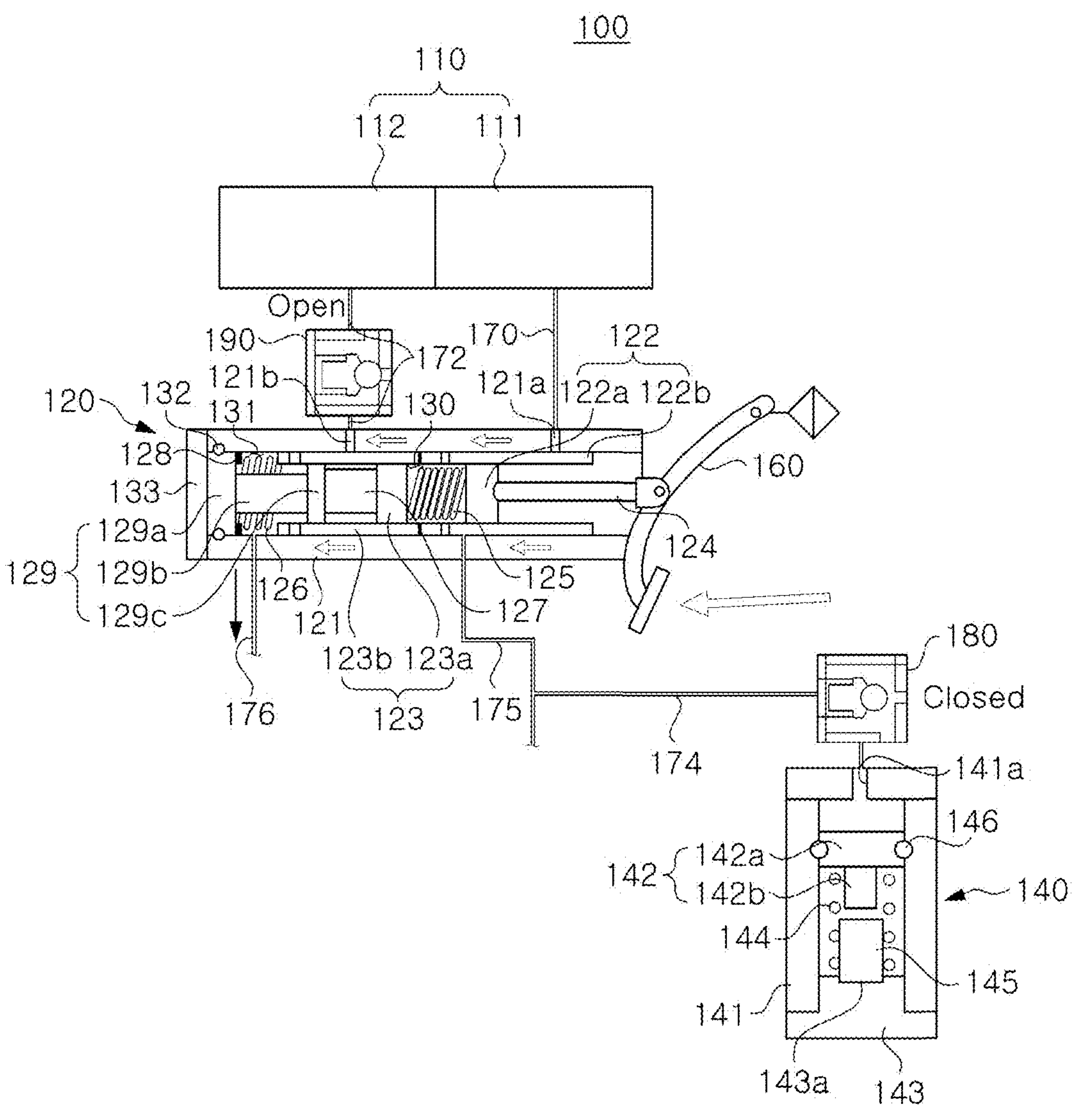

In more detail, as illustrated in FIG. 2, when a driver presses a brake pedal 160 to apply a force to the brake pedal 160, as the force is transmitted to a first piston 122 through a cylinder rod 124, the first piston 122 may move toward a second piston 123, and when the driver presses the brake pedal 160 to rotate the brake pedal 160 a little more, the first piston 122 may move closer to the second piston 123. Accordingly, the first piston 122 may move to be in contact with the second piston 123. As illustrated in FIG. 3, in a general driving mode, a first valve 180 may be controlled to be closed and a second valve 190 may be controlled to be opened. In the instant case, current may be applied to the first valve 180 and current may not be applied to the second valve 190. Thereafter, when the driver presses the brake pedal 160 to rotate the brake pedal 160 a little more, the second piston 123 may move by the first piston 122. In the instant case, because the brake pedal 160 may rotate with a smaller force, as compared to a track driving (high-speed driving) mode, which will be described later, a more comfortable pedal feel may be provided to the driver.

Figure 4:
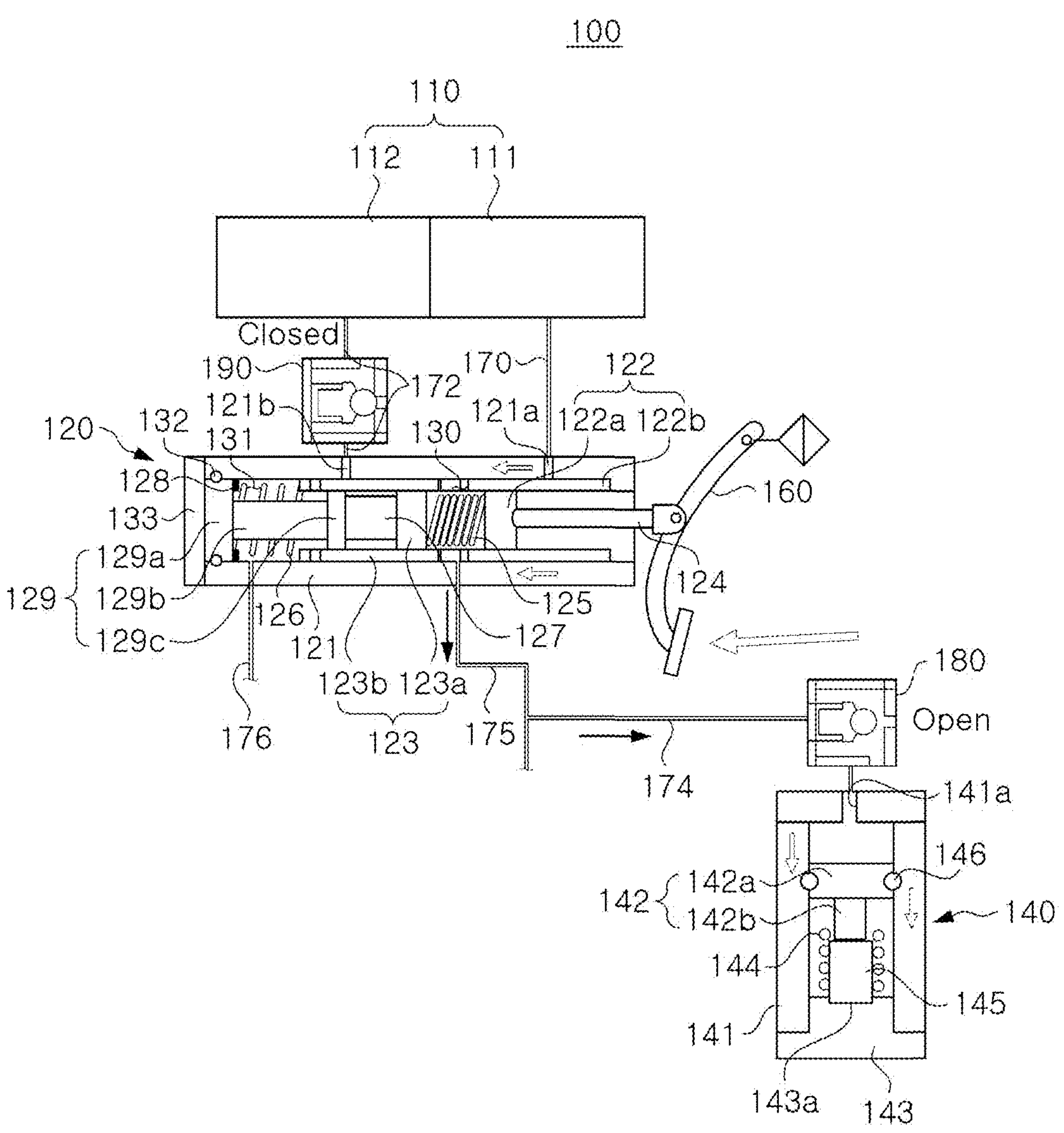

As illustrated in FIG. 4, in the track driving (high-speed driving) mode, the first valve 180 may be controlled to be opened, and the second valve 190 to be controlled to be closed. In the instant case, current may not be applied to the first valve 180, and current may be applied to the second valve 190. Thereafter, when the driver presses the brake pedal 160 to rotate the brake pedal 160 a little more, as oil is supplied to a pedal simulator 140, and a braking operation may be controlled by the pedal simulator 140. For example, when the driver presses the brake pedal 160 to rotate the brake pedal 160 a little more, oil may be supplied from a first bore 130 to an internal space of a case 141 of the pedal simulator 140. In the present manner, a third piston 142 may move due to a hydraulic pressure by the oil introduced through a first inlet 141*a* of the case 141. In the instant case, the driver should press the brake pedal 160 with a force, greater than a force applied to the brake pedal 160, to move the second piston 123 described above so that the third piston 142 moves. For example, in the high-speed driving mode, the driver should operate the brake pedal 160 with a greater force to performing a braking operation. Therefore, it is possible to provide the driver with pedal feel, different from pedal feel of the general driving mode.

A master cylinder 120 may be connected to a hydraulic pressure generator and a disk provided on each wheel through third and fourth pipes 175 and 176 into which oil flows, and oil supplied to the disk may be recovered to a reservoir 110 through a recovery line. Furthermore, a solenoid valve for controlling flow of the oil may be provided in the third and fourth pipes 175 and 176 and the recovery line.

Figure 5:
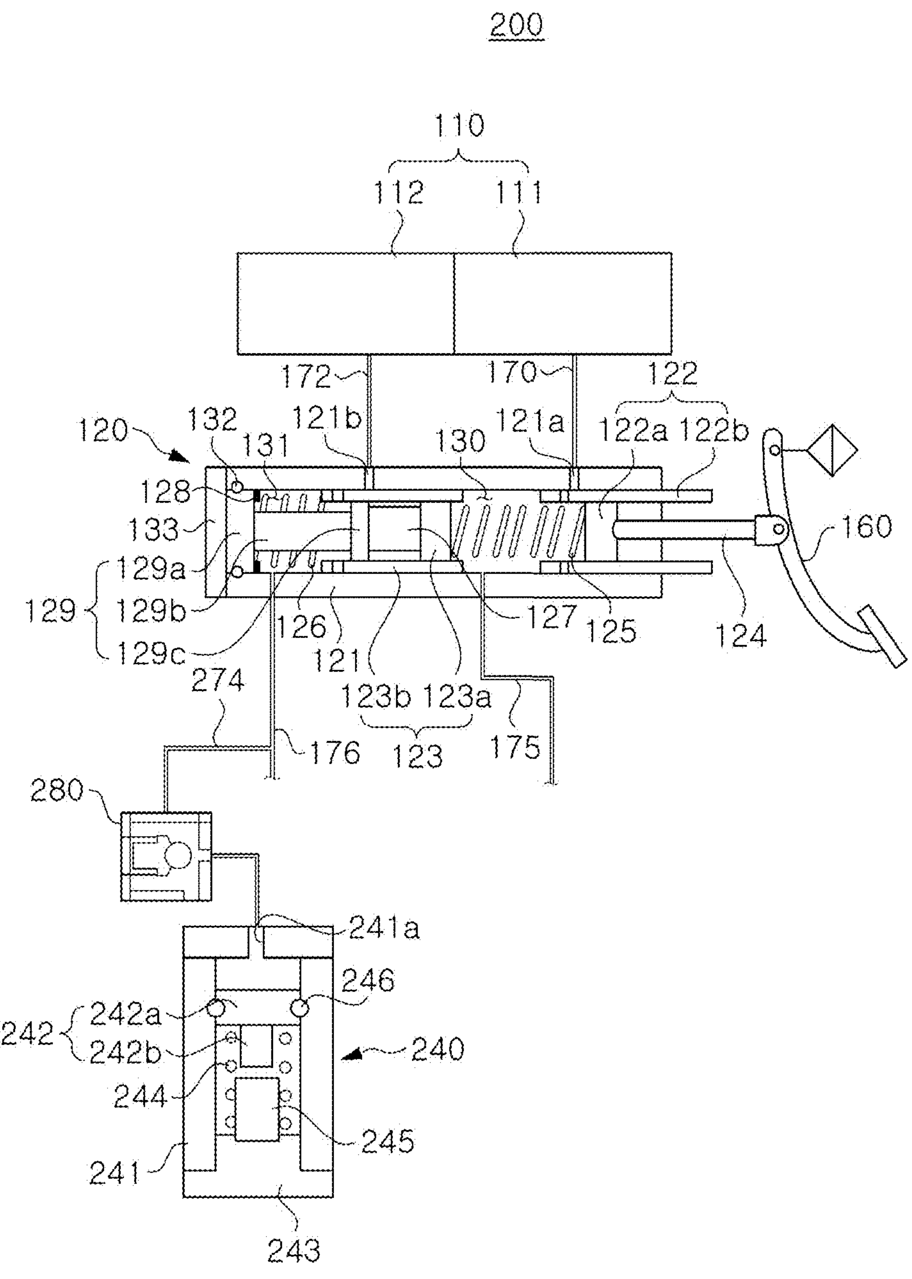
FIG. 5 is a schematic diagram illustrating a brake apparatus according to an exemplary embodiment of the present disclosure.

FIG. 5 is a schematic diagram illustrating a brake apparatus according to an exemplary embodiment of the present disclosure.

Referring to FIG. 5, a brake apparatus 200 according to an exemplary embodiment of the present disclosure may include a reservoir 110, a master cylinder 120, a pedal simulator 240, and a brake pedal 160.

Because the reservoir 110, the master cylinder 120, and the brake pedal 160 may be substantially identical to the components described above, a detailed description thereof will be omitted.

The pedal simulator 240 may be connected to a fourth pipe 176 through a connection line 274 so that oil may be supplied from a second bore 131 of the master cylinder 120. Furthermore, a first valve 280 may be provided in the connection line 274. Because a case 241, a third piston 242, a second stopper 243, a third spring 244, and a third damper 245, provided in the pedal simulator 240, may be substantially identical to the case 141, the third piston 142, the second stopper 143, the third spring 144, and the third damper 145, provided in the pedal simulator 140 described above, a detailed description thereof will be omitted.

In the instant case, an operation of the brake apparatus 200 according to an exemplary embodiment of the present disclosure will be described.

When a driver presses the brake pedal 160, as a force is transmitted to a first piston 122 through a cylinder rod 124, the first piston 122 may move toward a second piston 123, and when the driver presses the brake pedal 160 to rotate the brake pedal 160 a little more, the first piston 122 may move closer to the second piston 123. Accordingly, the first piston 122 may move to be in contact with the second piston 123. In a general driving mode, the first valve 280 may be closed, and in the instant case, current may be applied to the first valve 280. Thereafter, when the driver presses the brake pedal 160 to rotate the brake pedal 160 a little more, the second piston 123 may be moved by the first piston 122. In the instant case, because the brake pedal 160 may be rotated with a smaller force, as compared to a track driving (high-speed driving) mode, which will be described later, a more comfortable pedal feel may be provided to the driver. Furthermore, as oil flows from the second bore 131 through the fourth pipe 176, the oil may be provided to a disk provided on each wheel disposed on a rear end portion.

In the track driving (high speed driving) mode, the first valve 280 may be opened, and in the instant case, current may not be applied to the first valve 280. Thereafter, when the driver presses the brake pedal 160 to rotate the brake pedal 160 a little more, as oil is supplied to the pedal simulator 240, and a braking operation may be controlled by the pedal simulator 240. For example, when the driver presses the brake pedal 160 to rotate the brake pedal 160 a little more, oil may be supplied from the second bore 131 to an internal space of the case 241 of the pedal simulator 240. In the present manner, the third piston 242 may move due to a hydraulic pressure by the oil introduced through a first inlet 241*a* of the case 241. In the instant case, the driver should press the brake pedal 160 with a force, greater than a force applied to the brake pedal 160, to move the second piston 123 described above so that the third piston 242 moves. For example, in the high-speed driving mode, the driver should operate the brake pedal 160 with a greater force to performing a braking operation. Therefore, it is possible to provide the driver with pedal feel, different from pedal feel of the general driving mode.

Depending on a driving environment or the like, a driver may select a vehicle driving mode to change a pedal effort, pedal feel, or the like.

Therefore, an effect of improving pedal feel may be obtained by reducing a sense of difference felt by a driver according to a vehicle driving mode.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of one or more of A and B”. In addition, “one or more of A and B” may refer to “one or more of A or B” or “one or more of combinations of one or more of A and B”.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A brake apparatus comprising:

a reservoir in which oil is accommodated;

a master cylinder fluidically connected to the reservoir;

a pedal simulator fluidically connected to the master cylinder and into which the oil flows; and a brake pedal connected to the master cylinder and configured to be moved in response to a driver’s operation, wherein the master cylinder includes:

a first piston movably provided in a first bore of the master cylinder; and a second piston provided in a second bore of the master cylinder and movable by the first piston, wherein the pedal simulator and the master cylinder are fluidically connected to each other by a connection line through which the oil flows, and wherein the connection line is provided with a first valve controlling the flow of the oil to control movement of the second piston, wherein the master cylinder further includes:

a cylinder housing including an internal space;

a cylinder rod connecting the first piston and the brake pedal;

a first spring including a first end portion supported by the first piston and a second end portion supported by the second piston;

a second spring including a first end portion supported by the second piston and a second end portion supported by a first stopper provided in the cylinder housing; and a first damper disposed between the second piston and the first stopper.

2. The brake apparatus of claim 1, wherein the reservoir and the first bore are fluidically connected to each other by a first pipe, wherein the reservoir and the second bore are fluidically connected to each other by a second pipe, and wherein a second valve controlling the flow of the oil is provided in the second pipe.

3. The brake apparatus of claim 2, wherein the first valve and the second valve are selectively opened.

4. The brake apparatus of claim 1, wherein the connection line connects a fourth pipe connected to the second bore, and the pedal simulator.

5. The brake apparatus of claim 1, wherein the master cylinder further includes a second damper disposed inside the second spring and supported by the first stopper.

6. The brake apparatus of claim 1, wherein the master cylinder further includes a first cover disposed on one side of the first stopper and closing one side of the cylinder housing.

7. The brake apparatus of claim 1, wherein the first stopper includes a guide portion, and the second piston includes a sidewall portion in which the guide portion of the first stopper and the first damper are slidably mounted.

8. The brake apparatus of claim 1, wherein the pedal simulator includes:

a case including an internal space;

a third piston movably provided in the case;

a second stopper fixed to the case;

a third spring including a first end portion supported by the third piston and a second end portion supported by the second stopper; and a third damper disposed between the third piston and the second stopper.

9. The brake apparatus of claim 8, wherein an inlet into which the oil flows is provided in one end portion of the case.

10. The brake apparatus of claim 8, wherein a pedal effort applied to the brake pedal to move the third piston is greater than a pedal effort applied to the brake pedal to move the second piston.

11. A brake apparatus comprising:

a reservoir in which oil is accommodated;

a master cylinder fluidically connected to the reservoir;

a pedal simulator fluidically connected to the master cylinder; and a brake pedal connected to the master cylinder, wherein the master cylinder is provided with a first bore fluidically connected to the reservoir through a first pipe and a second bore fluidically connected to the reservoir through a second pipe, wherein a first piston is movably provided in the first bore and a second piston is movably provided in the second bore, wherein the pedal simulator and the master cylinder are fluidically connected to each other by a connection line through which the oil flows, wherein a first valve controlling the flow of the oil is provided in the connection line, wherein a second valve controlling supply of the oil from the reservoir to the second bore is provided in the second pipe, wherein the first valve and the second valve are selectively opened, and wherein a pedal effort applied to the brake pedal for movement of the second piston is smaller than a pedal effort applied to the brake pedal for movement of a third piston.

12. The brake apparatus of claim 11, wherein the pedal simulator is provided with the third piston configured to be moved in upward and downward directions by supply of the oil.

13. The brake apparatus of claim 11, wherein the master cylinder includes a first spring providing restorative force to the first piston and a second spring providing restorative force to the second piston.

14. The brake apparatus of claim 13, wherein the master cylinder is provided with a first damper preventing damage to the second piston.

15. The brake apparatus of claim 14, wherein the master cylinder further includes a first stopper, wherein the first stopper includes a guide portion, and wherein the second piston includes a sidewall portion in which the guide portion of the first stopper and the first damper are slidably mounted.

16. The brake apparatus of claim 15, wherein the master cylinder further includes a second damper disposed inside the second spring and supported by the first stopper.

17. The brake apparatus of claim 12, wherein the pedal simulator includes a third spring providing restorative force to the third piston.

18. The brake apparatus of claim 12, wherein the pedal simulator includes a third damper preventing damage to the third piston.

* * * * *